Patented Dec. 7, 1943

2,336,259

UNITED STATES PATENT OFFICE 2,336,259

REFINING OF STYRENE CRUDES

Wilbert A. King, Memphis, Tenn., Julius H. Kleiner, Atlantic City, N. J., and Allen R. Krotzer, Philadelphia, Pa., assignors, by mesne assignments, to Allied Chemical & Dye Corporation, a corporation of New York No Drawing. Application December 30, 1940, Serial No. 372,360

9 Claims. (Cl. 260—669)

This invention relates to the removal or inactivation of constituents which deleteriously or adversely affect heat polymerization in oils used in the production of polystyrene resins.

Crude styrene fractions produced by fractional distillation of the crude oils which generally serve as a source of styrene for the production of polystyrene resins contain materials which deleteriously or adversely affect heat polymerization of the styrene. The effect of these inhibitors or retarding agents is twofold; they reduce the rate of heat polymerization and impair the ultimate polymer. The reduced rate of polymerization is a disadvantage since it raises production costs. The impairment of the polystyrene is reflected in reduced average molecular size of polymer and possibly in altered molecular arrangement. Not only do the deleterious constituents reduce the average molecular weight of polystyrene but also they may influence the range and distribution of the variously sized molecules which are comprehended in the average molecular weight. There is reason to believe that under varying polymerization conditions the molecular arrangement of polystyrene may be altered, i. e. in place of long-chain polymers, corresponding molecular weight polymers in the form of "bundles" of short chains held together possibly by secondary valences may prevail.

The reduction in the average size of the polymer molecule is a serious disadvantage since high molecular complexity, i. e. large polymer size, is one of the more important specifications for commercial polystyrene. The melting point of the polystyrene resin, for example, and the toughness of the resin in a solid state are dependent upon molecular complexity. A resin of high molecular complexity usually produces high-viscosity solutions which are valuable in industry. The other factors, the range and distribution of molecular sizes making up the average molecular weight of the polystyrene, and the type of molecular structure, may also influence the physical properties of the styrene resin to different extents. Thus, for example, it has not infrequently been found that two polystyrene resins with the same melting point will yield in solution markedly different viscosities.

It is an object of this invention to provide a novel process for treating styrene crudes to effect the removal of constituents which deleteriously or adversely affect heat polymerization, so that upon subsequent polymerization there results a high yield of polystyrene having advantageous physical properties, especially high viscosity in solution.

We have discovered that by treating styrene crudes with sulfuric acid as disclosed and claimed in pending application Serial No. 349,279, filed August 1, 1940, and in addition, treating the partially purified crude after the sulfuric acid treatment with a mercury compound, constituents which tend to inhibit or deleteriously affect heat polymerization of the styrene are substantially completely inactivated or eliminated without substantial polymerization or other deleterious effect on the styrene.

As disclosed in the said pending application Serial No. 349,279, the sulfuric acid treatment effects the inactivation or removal of certain inhibitors which tend to affect deleteriously the polymerization of styrene during subsequent heat polymerization. While the exact chemical composition of the materials removed by the subsequent treatment with the mercury compound is not known, we believe that this treatment effects hydration of the acetylenic constituents, particularly phenyl acetylene, which are not removed by the sulfuric acid treatment and which, if present, would tend to inhibit polymerization of the styrene and thereby affect the quality of the styrene polymer produced upon subsequent heat polymerization. The hydrated acetylenic constituents may be readily removed by distillation before polymerization is carried out.

Styrene oils which may be treated by the process of our invention, and which are intended to be included within the term "styrene oil" as used in the claims, include the various crude resin oils generally used as a source of styrene for the production of polystyrene resins. Styrene or a homolog of styrene is the principal polymerizable constituent in such oils. As examples of styrene oils there may be mentioned the styrene fractions of drip oil (the oil which settles out of gas mains), coke oven oil and tar distillates, cracked petroleum, the crude product of styrene synthesis, and the styrene fraction from the product of pyrolysis of polystyrene. Resin crudes useful for polystyrene resin production generally contain about 20% or more by volume of styrene, which term is used herein to include homologs thereof, although in some instances a crude containing as low as 10% or less styrene may be employed for resin production.

The process of this invention is of particular importance for removing or inactivating polymerization inhibitors or retarding agents from styrene oils rich in styrene. For example, "close- "cut" styrene fractions of drip oil, i. e. styrene fractions of a boiling range about 140° to 150° C. containing 35% to 65% styrene obtained in the fractionation of drip oil, may be treated by our process with particular advantage. Also, a styrene fraction containing 85% to 98% styrene and boiling in the range of about 143° to 148° C. obtained by fractionation of the product of pyrolysis of polystyrene (e. g. by pyrolysis of an impure polystyrene resin) may advantageously be treated by our process.

Sulfuric acid pretreatment of the styrene oil is carried out under conditions so as to avoid the deleterious effect on the styrene and the substantial polymerization of styrene. To accomplish this, the process variables such as strength of acid, amount of acid, time of treatment and temperature of treatment are carefully controlled; that is, when strong sulfuric acid is employed (55° Bé.) the amount of acid, or the time and temperature of treatment are so regulated and correlated that the styrene is not adversely affected. Generally the strength of acid is restricted to about 55° Bé. or less. An acid strength of 40° to 55° Bé., preferably 50° Bé., is preferred.

The amount of acid used is varied with relation to the other variables in the process, i. e. the concentration of acid, time and temperature of treatment. Generally, 5% or less acid based on the weight of the crude will be found satisfactory. The use of about 3% acid based on the weight of the crude is preferred.

When treating a styrene oil containing a substantial amount of inhibitor material, it is advantageous to subject the oil to two or more successive washings with sulfuric acid, preferably using not more than about 5% acid, based on the weight of the oil, in each washing operation. To determine the number of washing operations required by any particular oil to obtain satisfactory removal or inactivation of polymerization inhibitors, the oil may be tested at the end of each successive sulfuric acid wash by carrying out an experimental polymerization to determine whether the desired results in yield and polymer size have been obtained. Generally, it is advantageous to agitate the oil with sulfuric acid for about an hour in each of the washing operations, although a longer or shorter time may be used, depending upon the strength or concentration of the acid and the degree of agitation employed. Crude styrene containing oils which have not been subjected to fractionation to separate a fraction rich in styrene generally require longer treatment, or treatment with stronger acid, than the close-cut styrene fractions.

The temperature during the sulfuric acid treatment is generally limited to below about 70° C. and preferably below about 50° C. for an acid of 50° Bé. or higher concentration. When several successive washing operations are employed it is advantageous to carry out the first washings at lower temperatures, for example, about room temperature. In general, the temperature should also be so correlated with the time of contact, strength and quantity of acid as to prevent any considerable loss of styrene by catalytic or heat polymerization, or by other reaction; for example, when operating with an acid of about 50° Bé. the temperature should generally not exceed 50° C. and the amount used is preferably about 2% to 3% based on the weight of the crude treated. Using a weaker acid, say about 40° Bé., a temperature up to about 70° C. may be employed, and a greater amount of acid may be used.

In a preferred method of carrying out our invention, the styrene fraction is agitated for about one hour with 3% by weight of 50° Bé. sulfuric acid. This treatment may be repeated three or four times as above indicated, the sludge being removed between each treatment. After removing the sludge from the final treatment, the crude is ready for the mercury compound treatment described below.

Following the sulfuric acid treatment hereinabove described, the partially purified styrene oil is treated with a mercury compound, i. e. a mercuric compound or a mercurous compound, to effect removal of acetylenic constituents, particularly phenyl acetylene. The mercury compound is preferably added to the partially purified crude in the form of a solution in sulfuric acid or other mineral acid, in an organic acid such as acetic acid, in water, or in other suitable solvent for the mercury compound. For example, a mercury salt such as mercuric or mercurous sulfate, acetate, or nitrate, or an oxide of mercury, or metallic mercury may be dissolved in sulfuric or other acid to from a solution of a mercuric or mercurous compound, and the resulting solution added to the crude. Solutions of moderate concentration have been found practicable. Sulfuric acid is the preferred solvent for the mercury compound, and the concentration of sulfuric acid in the treating solution may vary widely, e. g., we have found sulfuric acid strengths from about 5% to 62% to give successful results. The mercury compound is generally used in a relatively small proportion; for example, from ¼% to about 5% mercury compound, based on the weight of the crude, may be used. A sufficient amount of mercury compound should be used so that the rate of reaction makes the process commercially practicable.

In a preferred method of carrying out the treatment, from about ¼% to 1% mercuric sulfate or chemically equivalent amount of other mercuric compound, based on the weight of the crude, is dissolved in 20% sulfuric acid and this solution is added to the partially purified crude from the sulfuric acid treatment, and the mixture of crude and treating solution is agitated until the oil tests free of acetylenic compounds. This may be determined by removing a sample of the oil, neutralizing, and redistilling, agitating the distillate vigorously with an excess of ammoniacal silver nitrate; if no precipitate is formed, the treatment is considered complete. On completion of the removal of the acetylenic constituents, the reaction mixture is neutralized. Alkali, such as aqueous sodium hydroxide, may be added to make the mixture basic, and the mixture thereafter filtered, or the mixture may be first filtered and the oil layer thereafter separated and neutralized with alkali. In any case, the oil layer is thereafter distilled, preferably fractionated under reduced pressure, to effect the separation of ketone derivatives which it is believed are formed by hydration of acetylenic constituents, the mercury compound acting as a catalyst in this reaction.

The following examples are illustrative of the process of our invention:

A styrene fraction obtained by fractionating a light oil of gas plant origin and collecting a cut having a distillation range of from 142° to 146° C., the fraction containing approximately 70% styrene, the remainder being chiefly orthoxylene, was divided into two portions. One portion of this fraction was agitated for one hour with 5% by volume of 50° Bé. sulfuric acid, the acid sludge then settled and withdrawn. This acid treatment was twice repeated, using fresh 50° Bé. acid each time. During the first two acid treatments the temperature was within the range 28° to 30° C., and during the third treatment the temperature was raised to 50° C. The recovered oil layer was divided into three parts, part 1 containing 324 grams, part 2 containing 300 grams, and part 3, 324 grams. To these three parts were added respectively 3.6, 1.73 and 0.91 grams of mercuric sulfate in 100 ml. of 20% sulfuric acid; the percentage by weight of mercuric sulfate based on the weight of the oil was respectively 1.11, 0.58 and 0.28. The resultant mixtures were agitated until upon testing for acetylenic constituents the mixtures were found to be free thereof. The time of agitation for each part was 3, 4 and 6½ hours respectively.

The tests for acetylenic constituents hereinabove mentioned were made on each agitator every half hour as follows: The agitation was stopped and, after allowing five minutes for settling, a small sample of the oil was withdrawn by pipette. This sample was washed with strong sodium hydroxide solution to neutralize traces of acid, after which the separated oil was distilled. The reaction was pronounced complete when the distillate failed to form the metal acetylide precipitate during agitation with ammoniacal silver nitrate.

When each of the above three parts was found to be free of acetylenic constituents, i. e. upon completion of the agitation, parts 1 and 2 were combined and the acid layer withdrawn. The oil layer was filtered, neutralized with sodium hydroxide, and distilled. Ortho-xylene was added to the distillate to produce a mixture containing 60% styrene, and this mixture was heated at 100° C. for 120 hours in a sealed flask to produce polystyrene. The polymer recovered from its solvent had a viscosity at 25° C. of 4125 centipoises when dissolved in toluene to form a 25% by weight solution.

We have found it is important to carry out the removal of the acetylenic constituents by treatment as herein described and subsequent to treatment of crude with sulfuric acid; by so doing, more complete removal or inactivation of inhibitors which affect the polymerization of styrene may be accomplished in less time or with less mercury reagent than would be possible without prior sulfuric acid treatment. This is illustrated by the following:

A second portion of the crude without treatment with sulfuric acid as hereinabove described was divided into three parts, constituted of 301, 346 and 304 grams respectively, these three parts treated with 3.34, 1.97 and 0.82 grams of mercuric sulfate dissolved in 100 ml. of 20% sulfuric acid, the percentage by weight of mercuric sulfate relative to amount of oil treated being 1.11, 0.57 and 0.27 respectively. The mixtures were agitated and periodically tested as hereinabove described to determine whether or not acetylenic constituents had been removed. In the case of parts 1 and 2 they were found to be free of acetylenic compounds after agitation for 5 and 6 hours respectively. In the case of part 3, acetylenic material was still present after 14 hours, at which time the experiment was discontinued. Parts 1 and 2 were combined when free of acetylenic constituents, the acid layer withdrawn, and the oil layer filtered. This oil layer was then subjected to three washings with 50° Bé. sulfuric acid, exactly as described in connection with the operations involving the acid treatment prior to the mercuric sulfate treatment. The acid-treated material was neutralized and distilled. The distillate was adjusted to 60% styrene concentration with the addition of ortho-xylene and polymerized at 100° C. for 120 hours in a sealed flask in exactly the same manner as the polymerization was conducted in the operations hereinabove described. The viscosity at 25° C. of the 25% polymer solution in toluene was found to be 3470 centipoises; this compares with a viscosity of 4125 centipoises in the case of the polymer produced by polymerization of styrene made from a crude which had been subjected to an acid treatment prior to treatment with mercuric sulfate. The foregoing data show that for a given quantity of mercury reagent not only will the treatment time be shortened considerably if the crude is pretreated with sulfuric acid, but the crude is more completely freed of inhibitors, as shown by the increased viscosity of the polymer. Moreover, for a given treatment time appreciably less mercury reagent will be needed if the sulfuric acid pretreatment is used. It further appears that treatment of the crude with sulfuric acid prior to treatment with the mercuric sulfate or other mercury compound cuts down the side reactions during the mercury-compound treatment and thus results in a substantial economy in the mercury reagent employed to effect inactivation or removal of acetylenic-type polymerization inhibitors.

In operation it has been found that the treatment of styrene crudes with sulfuric acid followed by mercuric sulfate or other mercury compound treatment as hereinabove described is comparatively simple to carry out and results in substantially complete removal or inactivation of inhibitors which tend to inhibit or detrimentally affect the polymerization of styrene.

Removal of acetylenic bodies by the mercury compound treatment of this invention is positive and highly effective in that an irreversible hydration of the acetylenic bodies takes place when the crude is treated with the mercury reagent. When other reagents, e. g. cuprous salts, which have been tried, are used, instead of hydration of acetylenic bodies acetylides are formed by addition. This addition reaction appears to be reversible so that the metal acetylides tend to decompose and liberate the acetylenic bodies. Furthermore, cuprous reagents are difficult to handle since they are readily changed to the cupric state in which form they are unreactive.

The term "polymerization inhibitor" has been used broadly in the specification and claims to cover the constituents which deleteriously or adversely affect heat polymerization of styrene. The mechanics of the inhibition are not clearly understood and this application is, therefore, not limited to any particular type of deleterious constituents in the styrene oil.

The term "inactivate" has been used in various forms in the claims in a broad sense to include either removal or inactivation of the deleterious constituents of the styrene oil.

Since certain changes may be made in carrying out the above process without departing from the scope of the invention, it is intended that all matter container in the above description shall be interpreted as illustrative and not in a limiting sense.

We claim:

1. A process for inactivating styrene polymerization inhibitors in an impure styrene oil containing inhibitors of the acetylenic type which comprises treating the oil with sulfuric acid of not more than 55° Bé. concentration and at a temperature not higher than 70° C. for acid of less than 50° Bé. concentration and not higher than 50° C. for acid of a concentration of 50° Bé. to 55° Bé. and thereafter treating the oil with a reagent comprising a mercury salt to effect a substantially complete inactivation of polymerization inhibitors without substantial adverse effect on the styrene.

2. A process for inactivating styrene polymerization inhibitors in an impure styrene oil containing inhibitors of the acetylenic type which comprises treating the oil with sulfuric acid of a concentration of not more than 55° Bé. at a temperature not higher than 70° C., and thereafter agitating the oil with a reagent comprising a mercury salt.

3. A process for inactivating styrene polymerization inhibitors in an impure styrene oil containing inhibitors of the acetylenic type which comprises treating the oil with sulfuric acid of a concentration of not more than 55° Bé. at a temperature not higher than 70° C., thereafter agitating the oil with a reagent comprising a mercury salt dissolved in an acid solution, neutralizing the resultant acidified oil mixture, filtering the neutralized oil mixture and distilling the filtrate to separate, as distillate, the purified styrene oil.

4. A process for inactivating styrene polymerization inhibitors in an impure styrene oil containing inhibitors of the acetylenic type which comprises treating the oil with sulfuric acid of a concentration of not more than 55° Bé. at a temperature not higher than 70° C., thereafter agitating the oil with a reagent comprising a mercury salt dissolved in an acid solution, filtering the thus treated oil, neutralizing the filtrate, and distilling the neutralized filtrate to separate, as distillate, the purified styrene oil.

5. A process for inactivating styrene polymerization inhibitors in an impure styrene oil containing inhibitors of the acetylenic type which comprises treating the crude with sulfuric acid of a concentration of about 40° to 55° Bé., in amount not more than 5% based on the weight of the crude, at a temperature of not higher than 70° C., and thereafter treating the crude with a sulfuric acid solution of a mercury salt in amount from ¼ to 5% of mercuric salt based on the weight of the crude oil treated.

6. In a process for inactivating styrene polymerization inhibitors in an impure styrene oil containing inhibitors of the acetylenic type, the improvement which comprises inactivating styrene polymerization inhibitors in the oil by treating it with sulfuric acid of a concentration of about 50° Bé., in amount not more than 5% based on the weight of the crude, at a temperature not higher than 50° C., and thereafter agitating the partially purified oil with a sulfuric acid solution containing ¼ to 1% by weight of mercuric sulfate based on the weight of the oil, neutralizing the acid and distilling the neutralized oil to separate, as distillate, oil substantially free of acetylenic constituents.

7. A process for inactivating styrene polymerization inhibitors in an impure styrene oil containing inhibitors of the acetylenic type, which comprises treating said oil with sulfuric acid of a concentration of not more than 55° Bé., in amount not more than 5% based on the weight of the crude, at a temperature not higher than 70° C., removing the spent acid sludge from the oil, agitating the thus partially purified oil with a mercury salt and distilling the thus treated oil to separate, as distillate, oil substantially free of acetylenic constituents.

8. In a process for inactivating polymerization inhibitors in a crude styrene fraction of drip oil, the improvement which comprises treating said fraction successively with portions of sulfuric acid of concentration of about 50° Bé., the amount of each portion being not more than 5% based on the weight of the crude, at a temperature not higher than 70° C., removing the spent acid sludge after each treatment, and thereafter agitating the oil recovered from the last treatment with a sulfuric acid solution containing ¼ to 1% by weight of mercuric sulfate based on the weight of the oil, neutralizing the acid and distilling the neutralized oil to separate, as distillate, oil substantially free of acetylenic constituents.

9. A process for inactivating styrene polymerization inhibitors in a crude styrene fraction of drip oil which comprises treating said fraction successively with portions of sulfuric acid of concentration about 50° Bé., the amount of each portion being not more than 5% based on the weight of the crude, at a temperature not higher than 70° C., removing the spent acid sludge after each treatment, thereafter agitating the oil recovered from the last treatment with a sulfuric acid solution containing ¼ to 1% by weight of mercuric sulfate based on the weight of the oil, filtering the resultant mixture, neutralizing the filtrate and distilling the neutralized filtrate to separate, as distillate, oil substantially free of acetylenic constituents.

WILBERT A. KING.
JULIUS H. KLEINER.
ALLEN R. KROTZER.